(12) United States Patent
Gombert

(10) Patent No.: US 6,804,012 B2
(45) Date of Patent: Oct. 12, 2004

(54) ARRANGEMENT FOR THE DETECTION FOR RELATIVE MOVEMENTS OR RELATIVE POSITION OF TWO OBJECTS

(75) Inventor: Bernd Gombert, Grafrath (DE)

(73) Assignee: 3D Connection GmbH (DE)

( * ) Notice: Subject to any disclaimer, the term of this patent is extended or adjusted under 35 U.S.C. 154(b) by 270 days.

(21) Appl. No.: 10/095,004

(22) Filed: Mar. 12, 2002

(65) Prior Publication Data
US 2003/0103217 A1 Jun. 5, 2003

(30) Foreign Application Priority Data
Nov. 30, 2001 (DE) ......................................... 101 58 775

(51) Int. Cl.⁷ ............................................... G01B 11/14
(52) U.S. Cl. .................. 356/614; 250/208.6; 73/514.26
(58) Field of Search .................. 356/614, 615, 356/620, 621; 250/229, 231.1, 231.19, 221, 222.1, 227.21, 227.22, 208.6; 73/862.041, 862.042, 862.043, 862.324, 514.26

(56) References Cited

U.S. PATENT DOCUMENTS

| | | | |
|---|---|---|---|
| 3,628,394 A | 12/1971 | Keatinge et al. | |
| 3,921,445 A | 11/1975 | Hill et al. | |
| 4,178,799 A | 12/1979 | Schmieder et al. | |
| 4,409,736 A | 10/1983 | Seltzer | 33/169 C |
| 4,589,810 A | 5/1986 | Heindl et al. | |
| 4,763,531 A | 8/1988 | Dietrich et al. | |
| 4,785,180 A | 11/1988 | Dietrich et al. | |
| 5,648,617 A * | 7/1997 | Cullen et al. | 73/862.045 |

FOREIGN PATENT DOCUMENTS

| | | | |
|---|---|---|---|
| DE | 2727704 | 1/1979 | |
| DE | 3240251 | 6/1984 | |
| DE | 3314089 C2 | 10/1984 | ........... G01B/11/03 |
| DE | 3611336 | 10/1987 | |
| DE | 3611337 | 10/1987 | |
| DE | DT 29901998 U1 | 4/2000 | ........... G06K/11/08 |
| EP | 0117334 A2 | 9/1984 | ............. G01L/5/16 |

OTHER PUBLICATIONS

Bibliography and Abstract of German Patent DE2727704, esp@cenet.com, Jun. 2002 (1 pg.).
Bibliography and Abstract of German Patent DE3240251, esp@cenet.com, Jun. 2002 (1 pg.).
Bibliography and Abstract of German Patent DE3611336, esp@cenet.com, Jun. 2002 (1 pg.).
*Bibliography and Abstract of German Patent DE3611337*, esp@cenet.com, Jun. 2002 (1 pg.).

\* cited by examiner

Primary Examiner—Richard A. Rosenberger
Assistant Examiner—Vincent P. Barth
(74) Attorney, Agent, or Firm—Wood, Herron & Evans, LLP

(57) ABSTRACT

An optoelectronic arrangement for the detection of relative movements or relative positions of two objects, with the arrangement comprising at least four optoelectronic elements, characterized in that the optoelectronic elements are arranged in at least one first plane and in a second plane different from the first one in such a manner that at least three optoelectronic elements are arranged in the first plane and at least one optoelectronic element is arranged in the second plane. Further, a force and/or moment sensor provided with this arrangement with a first board and a second board, with the first board and the second board being elastically connected with each other and movable relative to one another. Finally, a personal computer keyboard which is provided with such a force and/or moment sensor.

21 Claims, 2 Drawing Sheets

ARRANGEMENT FOR THE DETECTION FOR RELATIVE MOVEMENTS OR RELATIVE POSITION OF TWO OBJECTS

DESCRIPTION

1. Background of the Invention

The invention relates to an optoelectronic arrangement for the detection of relative movements or relative positions of two objects, with the arrangement comprising at least four optoelectronic elements. In addition, the invention relates to a force and/or moment sensor which utilises such an arrangement. Finally, the invention relates to a PC keyboard which comprises the inventive force and/or moment sensor.

2. State of the Art

As arrangements for the detection of relative movements of two objects in force and/or moment sensors, arrangements with optoelectronic measuring cells have widely been accepted. The reason is the simple construction together with high precision and reliability.

DE 36 11 337 A1 discloses an optoelectronic arrangement accommodated in a plastic ball which can simultaneously detect six components, i.e. displacements along three axes and angular rotations about three axes. For this purpose, six light emitting means are arranged in a plane at equal angular distances. In front of each light emitting means a stationary slit diaphragm is provided. The relative movements or relative positions are sensed by photosensitive detectors which are movably arranged relative to the arrangement of light emitting means and slit diaphragms, and whose detector axes extend essentially perpendicular to the direction of the slits. The arrangement requires relatively low construction efforts because the light emitting means and the diaphragms as well as any other electronic means for controlling and evaluating can be arranged on a single printed board by means of a conventional soldering technique, which can be securely connected with a first object. The position sensitive detectors are connected with the second object. It is, however, disadvantageous that the arrangement requires a relatively large area. This is caused by the relatively large spatial extent of the diaphragms and detectors which are arranged in an annular pattern around the light emitting means. This imposes a constraint on the miniaturisation of the arrangement.

Further documents which do not claim to be exhaustive and which show the technical background of the invention are:

DE 27 27 704 C3; DE 36 11 336 C2; DE 32 40 251 A1; U.S. Pat. No. 3,921,445; U.S. Pat. No. 3,628,394.

PROBLEM ON WHICH THE INVENTION IS BASED

Optoelectronic arrangements for measuring relative movements or relative positions as well as force and/or moment sensors which utilise such arrangements have gained increased importance in the past, primarily in industrial applications. Examples are the control of robots and the measurement of forces in automotive test and measuring benches. In general, commercially most interesting applications, however, are also offered for the arrangements and sensors in the office field and in the field of entertainment electronics. Here, they have the function of an input device by means of which up to six components can be input, in contrast to a joystick, a mouse of a trackball which generally allow the input of only two components. A simple and convenient input of six components as it is provided for by a force and/or moment sensor with an optoelectronic arrangement is desirable for example in the control of 3D design software or sophisticated computer games. Due to their surface requirement, the present input devices are, however, definitely awkward to handle, which opposed any wider distribution. A miniaturisation would permit the installation e.g. into game consoles, PC keyboards, or notebook computers and thus enable a wide market penetration.

On the basis of the state of the art, the present invention is based on the object to create an arrangement for the detection of the relative movements or relative positions of two objects, which compared to the known arrangements has a reduced surface requirement. The invention is further based on the object to create a force and/or moment sensor which compared to the known sensors also has a reduced surface requirement. The invention is finally based on the object to create an input device for the application in an office environment which permits an uncomplicated input of up to six force or torque components.

INVENTIVE SOLUTION

For solution of this object, the invention teaches an optoelectronic arrangement for the detection of relative movements or relative positions of two objects, with the arrangement comprising at least four optoelectronic elements characterized in that the optoelectronic elements are arranged in at least one first plane and in a second plane different from the first one in such a manner that at least three optoelectronic elements are arranged in the first plane and at least one optoelectronic element is arranged in the second plane. Furthermore, the invention teaches a force and/or moment sensor with a first board and a second board, with the first board and the second board being elastically connected with each other and moveable relative to one another, characterized by an optoelectronic arrangement for the detection of relative movements or relative positions of two objects according to the invention as described above. Finally, the invention also teaches a personal computer keyboard, characterized in that it comprises a force and/or moment sensor as just mentioned.

Construction and Development of the Inventive Solution

In an embodiment of the invention, each of the four optoelectronic elements is either a position sensitive detector, preferably a position sensitive infrared detector, or a light emitting means, preferably infrared light emitting diodes (ILED). In addition, each position sensitive detector is preferably illuminated by a light emitting means in order to form a measuring cell.

In a development of the invention, a position sensitive detector is illuminated by exactly one light emitting means in order to form a measuring cell. In an alternative development of the invention, two position sensitive detectors are illuminated by a light emitting means in order to form two measuring cells with a common light emitting means. Thereby, preferably at each time only the one or the other of the two position sensitive detectors is read so that the light emitting means always forms a measuring cell with only one each of the position sensitive detectors.

Due to the fact that in each moment a light emitting means is associated with only one position sensitive detector, the output signal of the position sensitive detectors can be used for controlling the currents of the respectively associated light emitting means in such a manner that each position sensitive detector is subjected to the same constant light quantity. This is advantageous in that all measuring cells are widely unaffected by temperature and aging influences as well as contamination and component tolerances. The output signals of the position sensitive infrared detectors are also transmitted to an analog/digital converter for further processing and from there to a microprocessor.

A particularly compact construction is achieved in a preferred development of the invention in that the light emitting means are arranged in such a manner on a closed imaginary first surface which is plane or convex in each site that their respective emission directions extend towards a first inner space which is defined by the first surface. The position sensitive detectors are preferably also arranged on a closed imaginary second surface which is plane or convex in each site and in such a manner that their respective photosensitive sides face towards a second inner space which is defined by the second surface. The first and the second inner space preferably partially or even completely coincide so that a common inner space is generated about which the light emitting means and the position sensitive detectors are arranged. In a preferred embodiment of the invention, the light of a measuring cell from the light emitting means to the opposite position sensitive detector consequently always traverses the common inner space.

In order to be able to measure all six degrees of freedom by means of the optoelectronic arrangement, i.e. displacements along three linearly independent axes and rotations about three linearly independent axes as well, a preferred embodiment of the arrangement comprises six position sensitive detectors. Preferably, each plane comprises three position sensitive detectors. Moreover, the position sensitive detectors of each plane are preferably oriented at an essentially identical angular distance relative to each other so as to be rotated about an axis which extends essentially perpendicular to the plane in which the position sensitive detectors are arranged. With three position sensitive detectors being arranged in a common plane, the second and the third position sensitive detectors are rotated with respect to the orientation of the first position sensitive detector by essentially one third or two thirds, respectively, of a full revolution.

Furthermore, the first and the second plane, and all other planes, if provided, are arranged parallel to one another.

In a development of the invention a light emitting means of the first plane and a light emitting means of the second plane are arranged in pairs one above the other. In the same manner, a position sensitive detector of the first plane and a position sensitive detector of the second plane are arranged in pairs one above the other. This means that the essentially vertical projections of the two light emitting means or of the two position sensitive detectors, respectively, coincide on one of the two planes. It is particularly preferred that the pairs of position sensitive detectors arranged one above the other comprise a position sensitive detector each for detecting a movement essentially vertical to the first or second plane and a position sensitive detector for detecting a movement essentially horizontal to the first or second plane.

In a particularly compact and thus preferred construction, light emitting means which have a small lateral extent are arranged between two pairs each of position sensitive detectors.

In a preferred embodiment the optoelectronic arrangement for the detection of relative movements or relative positions also comprises one each slit diaphragm which is arranged in the beam path of the light emitting means between the light emitting means and the position sensitive detector, so that only a narrow light bar impinges on the downstream position sensitive detector. The direction of the slit of the slit diaphragm is oriented essentially perpendicular to the detector axis of the position sensitive detector.

In order to be able to measure relative movements or relative positions one component each of the system light emitting means, slit diaphragm, detector must be movable relative to the other two elements. In the preferred embodiment the light emitting means and the position sensitive detectors are mounted stationary on a printed board, while the slit diaphragms are movable relative to them. This is advantageous in that all electronic components can be accommodated on a single printed board.

In a particularly preferred embodiment, the light emitting means and position sensitive detectors are provided at the side of a cylindrical printed board, which faces inwards.

A cylindrical printed board is a printed board whose surface is defined by a surface of a cylinder or by a part of a surface of a cylinder. The surface of a cylinder is generated by parallel shift of a straight line along a curve.

Among others, the printed board shields the optoelectronic detectors against external stray light.

The inventive force and/or moment sensor comprises a first and a second board, with the first and the second board being elastically connected with each other and being movable relative to each other. It also comprises the inventive arrangement for detecting the movements of the first and the second board relative to each other. The boards are preferably printed boards, with the first board carrying all electronic components, in particular the light emitting means and the position sensitive detectors, as well as control electronics for controlling the currents of the light emitting means, amplifiers, if required, and a digital portion for data conversion, and/or other means. By arranging all electronic components on only one printed board, the assembly expenditure during the manufacture is significantly reduced.

The two boards are connected by at least one spring and/or damping means, preferably from one of the following components or combinations thereof: helical spring, spring assembly, elastomer, cast resin. These spring and/or damping means take up the forces and torques. If their elastic properties are known, the forces and torques acting relative to each other can be measured from the relative positions of the two boards.

The two boards are preferably elastically connected with each other by means of three spring and/or damping means. The spring and/or damping means are preferably arranged in a rotation symmetrical manner around a centre, around which the measuring cells, too, are arranged. This is advantageous in that invariably symmetrical forces are acting in the force and/or moment sensor. It is particularly preferred that exactly three spring or damping means are arranged each rotated by one third of a full revolution relative to one another.

In a preferred embodiment at least one of the spring and/or damping means comprises at least one helical spring which at its two opposite ends is securely connected with the first or the second board, respectively, by soldering. In this manner, the helical springs can be loaded in all directions, i.e. tension and compression forces as well as forces acting transversely to the spring can be applied without the springs moving in their seats or even coming out of them.

A preferred embodiment of the force and/or moment sensor further comprises at least one stop means which limits the relative movement of the two boards towards each other. This is preferably realised by stop bolts which are firmly connected with one board. In this manner, the force and/or moment sensor is protected against overload.

From the inventive configuration of the arrangement for detecting the relative movements or relative positions of two objects the following advantageous properties result:

1. Most compact design with low construction expenditure;
2. high linearity, low hysteresis, and a large degree of freedom from wear by the application of optoelectronic measuring cells.

From the inventive configuration of the force and/or moment sensor the following advantageous property results in addition to the above mentioned ones:

3. Low susceptibility against damage by the application of stop means.

From the inventive configuration of the PC keyboard the following advantageous property results in addition to the above mentioned ones:

4. The novel personal computer keyboard permits the uncomplicated input of up to six components at the personal computer workplace.

Further characteristics, properties, advantages, and possible modifications will become apparent for those with skill in the art from the following description of a preferred embodiment in which reference is made to the accompanying drawings.

SHORT DESCRIPTION OF THE DRAWINGS

DETAILED DESCRIPTION OF AN EMBODIMENT

Figure 1:
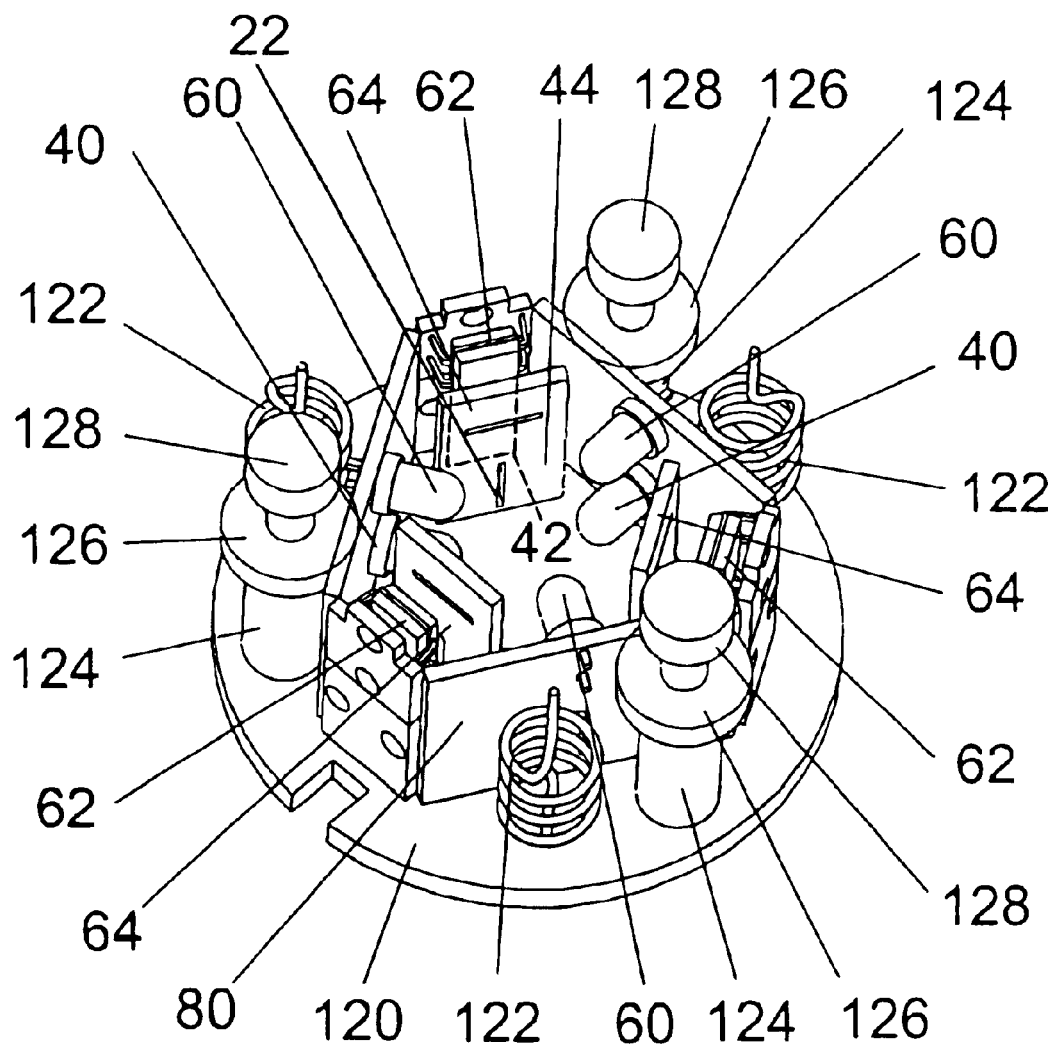
FIG. 1 shows a preferred embodiment of the inventive force and/or moment sensor with the inventive optoelectronic arrangement for the detection of relative movements or relative positions of two objects in a perspective view without the second board.

The optoelectronic arrangement for the detection of relative movements or relative positions of two objects as shown in FIG. 1 comprises twelve optoelectronic elements, namely six ILEDs 40, 60 and six position sensitive infrared detectors 42, 62, which are arranged in a first plane and a second plane different from the first plane. Six optoelectronic elements 40, 42, namely three ILEDs 40 and three position sensitive infrared detectors 42 are arranged in the first plane and six optoelectronic elements 60, 62, namely three ILEDs 60 and three position sensitive infrared detectors 62 are arranged in the second plane.

Each position sensitive infrared detector 42, 62 is illuminated by an ILED 40, 60. Thereby one ILED 40, 60 illuminates exactly one position sensitive detector 42, 62 in order to form a measuring cell. The light beam extends in the same plane in which the optoelectronic elements of the respective measuring cell are arranged.

The ILED's are mounted in pairs on printed board pieces which together with the printed board pieces on which the position sensitive detectors 42, 62 are mounted form a closed cylindrical surface 80 with hexagonal cross-section. If one imagines the openings of the cylindrical surface closed by an upper and a lower plane end surface, an imaginary closed first surface is generated which is plane or convex at each site. At the inside of this surface the six ILEDs 40, 60 are arranged in such a manner that their respective emission directions extend towards a first inner space which is defined by the first surface. In other words, all ILEDs 40, 60 shine from the inside of the printed board 80 into the interior of the cylinder defined by the printed board 80.

Like the ILEDs 40, 60 the position sensitive infrared detectors 42, 62 are mounted on the inside of the printed board 80, i.e. on a plane or convex closed imaginary second surface. The six position sensitive detectors 42, 62 are arranged in such a manner that their respective photosensitive sides face towards the second inner space. The first and second surface are identical and therefore the first and second inner space coincide completely to form a common inner space. The light emitting means 40, 60 and the position sensitive detectors 42, 62 are thus arranged around the common inner space. The ILED 40, 60 and the associated position sensitive detector 42, 62 of a measuring cell are arranged opposite each other and the light traverses the common inner space.

The optoelectronic arrangement of the preferred embodiment which is introduced here can measure relative movements or relative positions of two objects in six degrees of freedom, namely displacements in three linearly independent spatial directions and rotations also about three linearly independent spatial directions. For this purpose, six position sensitive infrared detectors 42, 62 are provided which together with the six ILED's 40, 60 form six measuring cells. Moreover, the position sensitive infrared detectors 42, 62 each are arranged rotated relative to each other by one third of a full revolution about the axis of symmetry of the cylindrical surface defined by the printed board 80. In exactly the same manner the ILEDs 40, 60 each are arranged rotated relative to each other by one third of a full revolution about the same axis of symmetry. The axis of symmetry extends vertically to the first and second plane.

One ILED 40 of the first plane and one ILED 60 of the second plane are arranged in pairs one above the other. In exactly the same manner a position sensitive infrared detector 42 of the first plane and a position sensitive infrared detector 62 of the second plane are always arranged in pairs one above the other. The vertical projections of the two ILEDs 40, 60 or of the two position sensitive infrared detectors 42, 62, respectively, in one of the two planes are always coinciding. The ILED pairs 40, 60 are arranged between two pairs of position sensitive infrared detectors 42, 62 each.

The pairs of position sensitive infrared detectors 42, 62 mounted one above the other consist of one each position sensitive infrared detector 42 for detecting a movement perpendicular to the first plane and a position sensitive infrared detector 62 for detecting a movement in the first plane.

For this purpose, a slit diaphragm 22, 64 is arranged in the beam path of the ILED in front of the position sensitive infrared detector. They comprise a narrow slit so that only a narrow light strip impinges on the position sensitive detector 42, 62. The direction of the slit of the slit diaphragm is perpendicular to the detector axis, i.e. in the measuring direction of the detector. Due to the fact that one element of the system light emitting means 40, 60, slit diaphragm 44, 64, and position sensitive infrared detector 42, 62 is arranged so as to be movable relative to the other elements the measuring cell can detect relative movements and relative positions.

In the preferred embodiment introduced herein, the slit diaphragm 44, 64 is movable relative to the position sensitive detector 42, 62 and the light emitting means 40, 60. The position sensitive detectors 42, 62 and the ILEDs 40, 60 are securely arranged on the cylindrical printed board 80. The slit diaphragms 44, 64 which are assigned a pair of detectors arranged one above the other are combined to a single slit diaphragm 44, 64 with two slits extending perpendicular to one another.

Figure 2:
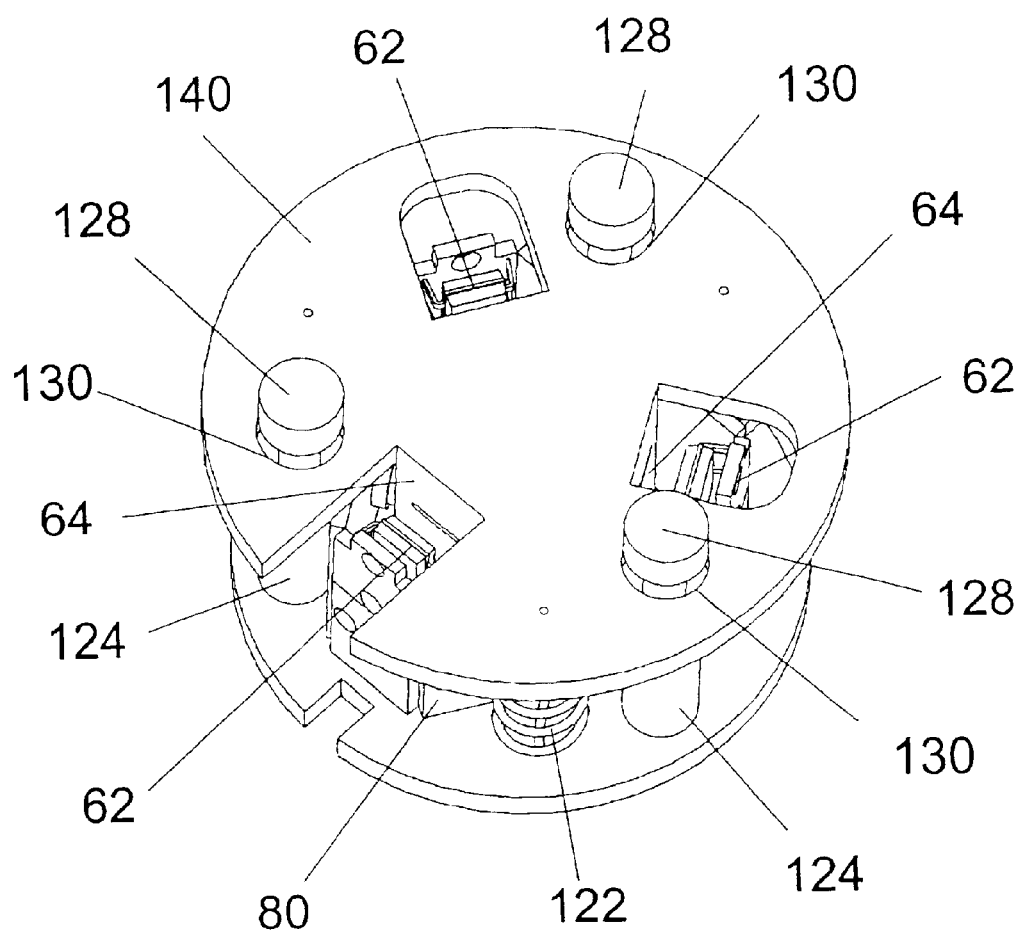
FIG. 2 shows the same preferred embodiment of the inventive force and/or moment sensor with the inventive optoelectronic arrangement for the detection of relative movements or relative positions of two objects in a perspective view with the second board.

The force and/or moment sensor which is also shown both in FIG. 1 and FIG. 2 consists of a first board 120 and a second board 140 which are elastically connected with each other and are movable relative to one another. It is provided with an inventive arrangement for the detection of relative movements or relative positions between the first board 120 and the second board 140. The first board is preferably a printed board to which the printed board 80 which carries the ILEDs 40, 60 and the position sensitive infrared detectors 42, 62 is firmly soldered. The first board 120 carries further electronic components. The slit diaphragms 44, 64 are firmly connected with the second board 140 by soldering.

Helical springs 122 act as spring means which connect the first board 120 and the second board 140 elastically with each other. The helical springs 122 are soldered to the first board 120 with their one end and to the second board 140 with their other end. Three helical springs are provided which are arranged rotation symmetrically, near the outside of the printed board 80 at one pair each of the infrared light emitting diodes 40, 60.

In order to limit the relative movements or relative positions of the two boards 120, 140 so that any overload cannot result in damage occurring to the force and/or moment sensor, three stop means 124 in the form of stop bolts are provided. The stop bolts are securely connected with the first board 120 and project through holes 130 in the second board 140. The horizontal movement of the first board 120 relative to the second board 140 is determined by the diameter of the stop means 124 and the diameters of the holes 130 in the second board 140. The movement of the two boards 120, 140 relative to one another is limited by enlargements 126, 128 at the bolt-shaped stop means 124. The distance of the enlargements 126, 128 from the second board 140 towards the bolts 124 determines the range within which the first board 120 and the second board 140 are movable relative to one another in the vertical direction.

What is claimed is:

1. An optoelectronic arrangement for the detection of relative movements or relative positions of two objects, with the arrangement comprising at least four optoelectronic elements, characterized in that the optoelectronic elements are arranged in at least one first plane and in a second plane different from the first one in such a manner that at least three optoelectronic elements are arranged in the first plane and at least one optoelectronic element is arranged in the second plane.

2. The optoelectronic arrangement according to claim 1, characterised in that each of the at least four optoelectronic elements is either a position sensitive detector (42, 62) or a light emitting means (40, 60) and each position sensitive detector (42, 62) is illuminated by a light emitting means (40,60) in order to form a measuring cell.

3. The optoelectronic arrangement according to claim 2, characterised in that one light emitting means (40,60) illuminates exactly one position sensitive detector (42, 62) each in order to form a measuring cell.

4. The optoelectronic arrangement according to claim 2, characterised in that one light emitting means (40, 60) illuminates at least two position sensitive detectors (42, 62) in order to form two measuring cells with a common light emitting means (40, 60).

5. The optoelectronic arrangement according to claim 2, characterised in that the light emitting means (40, 60) are arranged on a closed imaginary first surface in such a manner that their respective emission directions extend into a first inner space which is defined by the first surface.

6. The optoelectronic arrangement according to claim 2, characterised in that the position sensitive detectors (42, 62) are arranged on a closed imaginary first surface in such a manner that their respective photosensitive sides face towards a second inner space which is defined by the second surface, and the first and second inner spaces partially or completery coincide.

7. The optoelectronic arrangement according to claim 2, characterised in that the optoelectronic arrangement comprises at least six position sensitive detectors (42, 62) for measuring six degrees of freedom and each plane comprises exactly three position sensitive detectors (42, 62).

8. The optoelectronic arrangement according to claim 2, characterised in that the position sensitive detectors (42, 62) are oriented at an essentially identical angular distance relative to each other so as to be rotated about an axis which extends essentially perpendicular to the plane in which the position sensitive detectors (42, 62) are arranged.

9. The optoelectronic arrangement according to claim 2, characterised in that the planes are arranged essentially parallel to each other.

10. The optoelectronic arrangement according to claim 2, characterised in that one light emitting means (40) of the first plane and one light emitting means (80) of the second plane are arranged in pairs one above the other and a position sensitive detector (42) of the first plane and a position sensitive detector (62) of the second plane are arranged in pairs one above the other in such a manner each that the vertical projections of the two light emitting means (40, 60) or of the two position sensitive detectors (42, 62), respectively, essentially coincide in one of the two planes.

11. The optoelectronic arrangement according to claim 10, characterised in that the pairs of position sensitive detectors (42, 62) arranged one above the other each comprise a position sensitive detector (42) for detecting a movement essentially perpendicular to the first or second plane and a position sensitive detector (62) for detecting a movement essentially in the first or second plane.

12. The optoelectronic arrangement according to claim 2, characterised in that the measuring cells also comprise one slit diaphragm (44, 64) arranged in the beam path of the light emitting means (40, 60) between the light emitting means (40, 60) and the position sensitive detector (42, 62), with a detector axis of the position sensitive detector (42, 62) being aligned essentially perpendicular to the slit direction of the slit diaphragm (44, 64) and with an element of the system consisting of light emitting means (40,60), slit diaphragm (44, 64), and detector (42, 62) being moveable relative to the two other elements.

13. The optoelectronic arrangement according to claim 12, characterised in that in each measuring cell the slit diaphragm (44, 64) is movable relative to the position sensitive detector (42, 62) and the light emitting means (40, 60).

14. The arrangement according to claim 12, characterised in that the position sensitive detectors (42, 62) and/or the light emitting means (40, 60) are mounted on a printed board (80) which is cylindrical.

15. A force and/or moment sensor with a first board and a second board, with the first board (120) and a second board (140) being elastically connected with each other and moveable relative to one another, characterised by an optoelectronic arrangement for the detection of relative movements or relative positions of two objects according to claim 1.

16. The force and/or moment sensor according to claim 15, characterised in that the first and the second board (120, 140) are connected with each other via at least one spring and/or damping means (122).

17. The force and/or moment sensor according to claim 16, characterised in that the at least one spring and/or damping means (122) comprises one of the following components or combinations thereof: helical spring, spring assembly, elastomer, cast resin.

18. The force and/or moment sensor according to claim 16, characterised in that the spring and/or damping means (122) are arranged essentially rotation symmetrically.

19. The force and/or moment sensor according to claim 16, characterised in that at least one of the spring and/or damping means (122) comprises at least one helical spring which is firmly connected with the first and second board (120, 140) by soldering.

20. The force and/or moment sensor according to claim 15, characterised by at least one stop means (124) which limits the movement of the first board relative to the second board.

21. A personal computer keyboard, characterised in that it comprises a force and/or moment sensor according to claim 15.

* * * * *

UNITED STATES PATENT AND TRADEMARK OFFICE
CERTIFICATE OF CORRECTION

PATENT NO. : 6,804,012 B2
DATED : October 12, 2004
INVENTOR(S) : Gombert

It is certified that error appears in the above-identified patent and that said Letters Patent is hereby corrected as shown below:

Title page, Item [54] and Column 1, line 1,
Title, reads "ARRANGEMENT FOR THE DETECTION FOR ..." and should read -- ARRANGEMENT FOR THE DETECTION OF... --.

Title page,
Item [73], Assignee, reads "3D Connection GmbH" and should read -- 3DConnexion GmbH --.

Column 6,
Lines 6-7, reads "1. An optoelectronic arrangement for the detection of relative movements or relative positions of two objects, with the arrangement comprising at least four optoelectronic elements, characterized in that the optoelectronic elements are arranged in at least one first plane and in a second plane different from the first one in such a manner that at least three optoelectronic elements are arranged in the first plane and at least one optoelectronic element is arranged in the second plane." and should read -- 1. An optoelectronic arrangement for the detection of relative movements or relative positions of two objects, with the arrangement comprising at least four optoelectronic elements, characterized in that the optoelectronic elements are arranged in a stacked configuration in at least one first plane and in a second plane different from and essentially parallel to the first one in such a manner that at least three optoelectronic elements are arranged in the first plane and at least one optoelectronic element is arranged in the second plane.--.

UNITED STATES PATENT AND TRADEMARK OFFICE
CERTIFICATE OF CORRECTION

PATENT NO. : 6,804,012 B2
DATED : October 12, 2004
INVENTOR(S) : Gombert

It is certified that error appears in the above-identified patent and that said Letters Patent is hereby corrected as shown below:

Column 8,
Line 5, reads "...partially or completery coincide." and should read -- ...partially or completely coincide. --.
Line 22, reads "...one light emitting means (80) of the..." and should read -- ...one light emitting means (60) of the... --.

Signed and Sealed this

Eleventh Day of October, 2005

JON W. DUDAS
*Director of the United States Patent and Trademark Office*